United States Patent
Oehrlein et al.

(10) Patent No.: US 10,019,280 B2
(45) Date of Patent: Jul. 10, 2018

(54) TECHNOLOGIES FOR DYNAMICALLY MANAGING DATA BUS BANDWIDTH USAGE OF VIRTUAL MACHINES IN A NETWORK DEVICE

(71) Applicant: Intel Corporation, Santa Clara, CA (US)

(72) Inventors: Scott Oehrlein, Chandler, AZ (US); Shrikant M. Shah, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 174 days.

(21) Appl. No.: 15/080,892

(22) Filed: Mar. 25, 2016

(65) Prior Publication Data
US 2017/0277554 A1   Sep. 28, 2017

(51) Int. Cl.
*G06F 9/455*   (2018.01)
*H04L 12/24*   (2006.01)

(52) U.S. Cl.
CPC ...... *G06F 9/45558* (2013.01); *H04L 41/0893* (2013.01); *H04L 41/0896* (2013.01); *G06F 2009/45579* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 7,529,836 B1 * | 5/2009 | Bolen | | G06F 3/0611 |
| | | | | 709/226 |
| 9,438,466 B1 * | 9/2016 | O'Gorman | | H04L 29/08072 |
| 9,697,144 B1 * | 7/2017 | Chen | | G06F 13/105 |
| 2011/0292792 A1 * | 12/2011 | Zuo | | H04L 47/20 |
| | | | | 370/230 |
| 2013/0254767 A1 * | 9/2013 | Mizuno | | G06F 9/455 |
| | | | | 718/1 |
| 2014/0244866 A1 * | 8/2014 | Manula | | G06F 13/28 |
| | | | | 710/27 |
| 2014/0347998 A1 * | 11/2014 | Kim | | H04L 47/11 |
| | | | | 370/236 |
| 2015/0040121 A1 * | 2/2015 | Barabash | | G06F 9/45558 |
| | | | | 718/1 |

(Continued)

OTHER PUBLICATIONS

International search report for PCT application No. PCT/US2017/019070, dated May 26, 2017 (3 pages).

(Continued)

*Primary Examiner* — Bunjob Jaroenchonwanit
(74) *Attorney, Agent, or Firm* — Barnes & Thornburg LLP

(57) ABSTRACT

Technologies for dynamically managing data bus bandwidth usage of virtual machines include a network device that includes a data bus, one or more processors coupled to the data bus, and one or more throttled devices coupled to the data bus. Each throttled device is configured to use no more than an amount of bus bandwidth associated with at least one throttle value assigned to the corresponding throttled device. The network device is to assign functions to virtual machines, determine throttle values for each of the throttled devices utilized by the virtual machines to perform their assigned functions, and perform the assigned functions subject to the determined throttle values. Other embodiments are described and claimed.

25 Claims, 7 Drawing Sheets

(56) References Cited

U.S. PATENT DOCUMENTS

| | | | | |
|---|---|---|---|---|
| 2015/0180886 A1* | 6/2015 | Staniford | ............ | H04L 63/1416 |
| | | | | 726/23 |
| 2015/0326481 A1* | 11/2015 | Rector | .................... | H04L 47/14 |
| | | | | 370/236 |
| 2016/0170793 A1* | 6/2016 | Decusatis | ........... | G06F 9/45558 |
| | | | | 718/1 |
| 2017/0286680 A1* | 10/2017 | Benoit | .................. | G06F 21/566 |

OTHER PUBLICATIONS

Written opinion for PCT application No. PCT/US2017/019070, dated May 26, 2017 (8 pages).

* cited by examiner

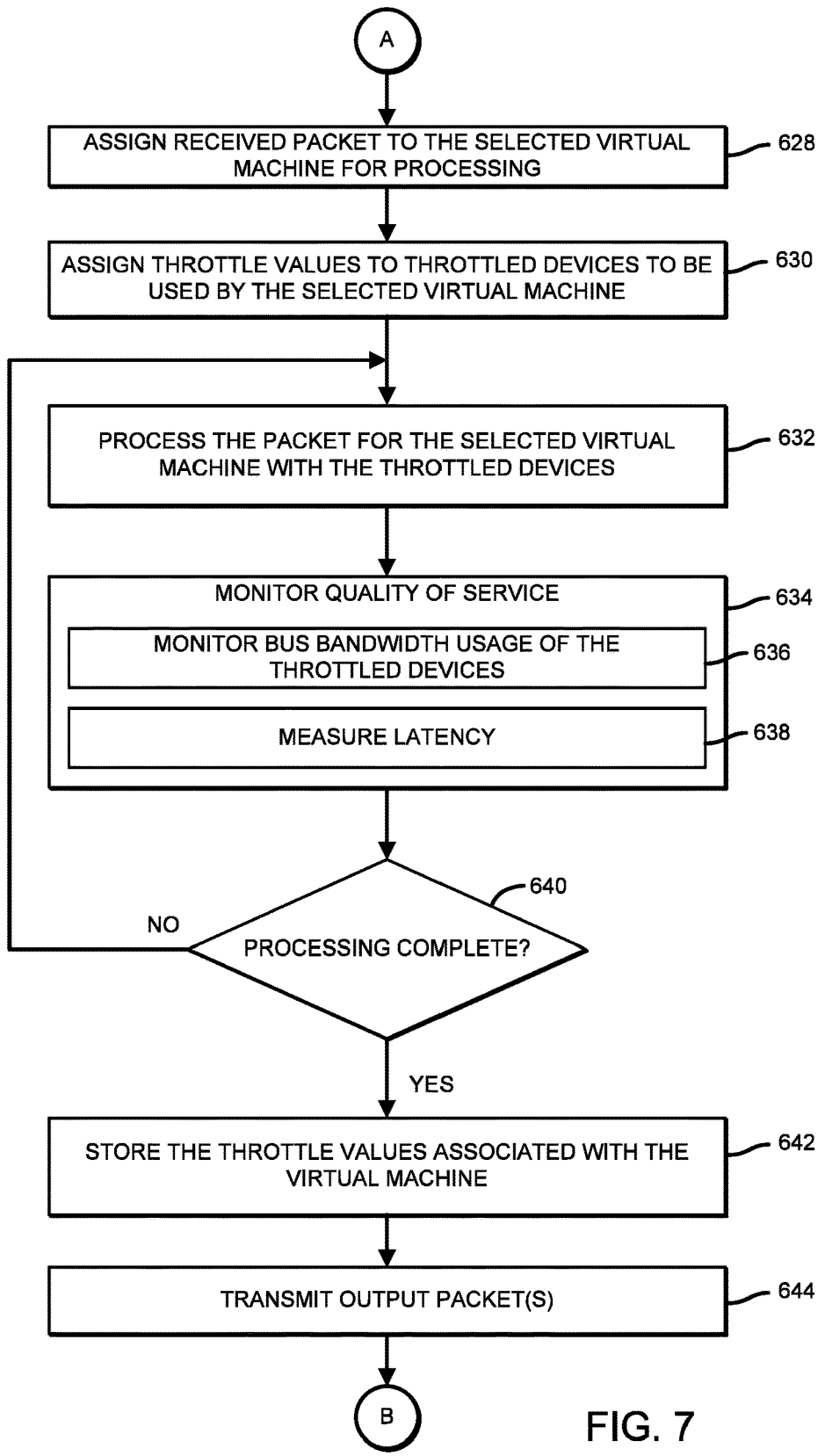

US 10,019,280 B2

TECHNOLOGIES FOR DYNAMICALLY MANAGING DATA BUS BANDWIDTH USAGE OF VIRTUAL MACHINES IN A NETWORK DEVICE

BACKGROUND

The performance of many embedded and networking workloads rely heavily on the architecture of the input/output (I/O) sub-systems. In modern processor architectures, several I/O devices may be connected to a processor via a data bus. In a virtualized environment, a processor can have multiple devices or multiple virtual functions assigned to different virtual machines. There are no mechanisms in place in modern general purpose architectures to limit the amount of I/O bandwidth a device or device function is allowed to consume. Without the ability to control how much of the I/O bandwidth a single device or device function may consume, it is possible for such a device or function to deprive other devices of I/O bandwidth and cause unpredictable delays in the processing of the workloads.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIGS. 6-7 are a simplified flow diagram of at least one embodiment of a method for dynamically managing data bus bandwidth usage of the virtual machines initialized in method of FIG. 5 that may be performed by the network device of FIG. 2.

DETAILED DESCRIPTION OF THE DRAWINGS

Figure 1:
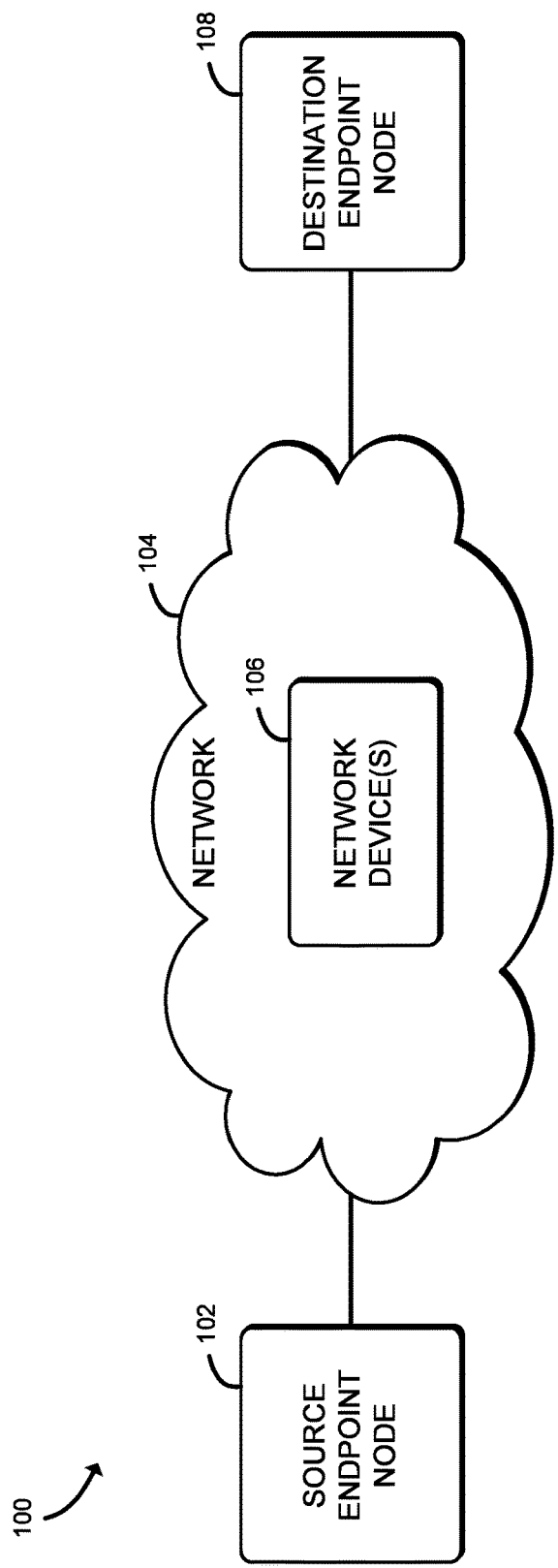
FIG. 1 is a simplified block diagram of at least one embodiment of a system that includes a network device for dynamically managing data bus bandwidth usage of virtual machines.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for dynamically managing data bus bandwidth usage of virtual machines to process network packets includes a source endpoint node 102 and a destination endpoint node 108 in communication over a network 104 via one or more network devices 106. In use, the network device 106 facilitates the transmission of network packets (e.g., based on workload type, flow information, etc.) between the source endpoint node 102 and the destination endpoint node 108 over the network 104. As described in more detail herein, the illustrative network device 106 assigns processes to various virtual machines within the network device 106 to process the network packets. Further, depending on the types of workloads (i.e., functions) assigned to the various virtual machines, and other factors, such as priorities assigned to the virtual machines, the illustrative network device 106 throttles the amount of data bus bandwidth used by various devices as the devices perform the functions on behalf of the various virtual machines. Additionally, the illustrative network device 106 dynamically increases or decreases the amount of data bus bandwidth each device may consume when operating on behalf of the various virtual machines based on various adjustment factors (i.e., indications of a present or historical status of the virtual machine), such as whether a particular virtual machine is experiencing a malicious attack, a priority level associated with a source of the data packets processed by a particular virtual machine, an impact that a particular virtual machine has had on the overall quality-of-service (i.e., latency, throughput, etc.) of the network device 106, and/or other factors. By dynamically throttling the devices, the network device 106 may more precisely balance loads and maintain a more consistent and deterministic quality-of-service when processing network packets.

The source endpoint node 102 may request data from the destination endpoint node 108 by sending one or more network packets that indicate the source endpoint node 102 is requesting data from the destination endpoint node 108. In response to the request, the destination endpoint node 108 may attempt to transmit a response message that includes data (e.g., a payload, a message body, etc.) via one or more network packets to the source endpoint node 102 across the network 104. Typically, the network packets are processed by the network devices 106 prior to being forwarded along. For example, a network device 106 may allocate a number of computing resources for one or more virtual machines (VMs) to perform various network functions or services (e.g., inspection services, firewalls, encryption services, data compression services, authentication services, etc.) based on a characteristic of each network packet, such as a workload type, a flow, an identifying tuple, etc.). Accordingly, the network device 106 can process each network packet using the allocated VMs configured to perform designated network functions or services.

Figure 2:
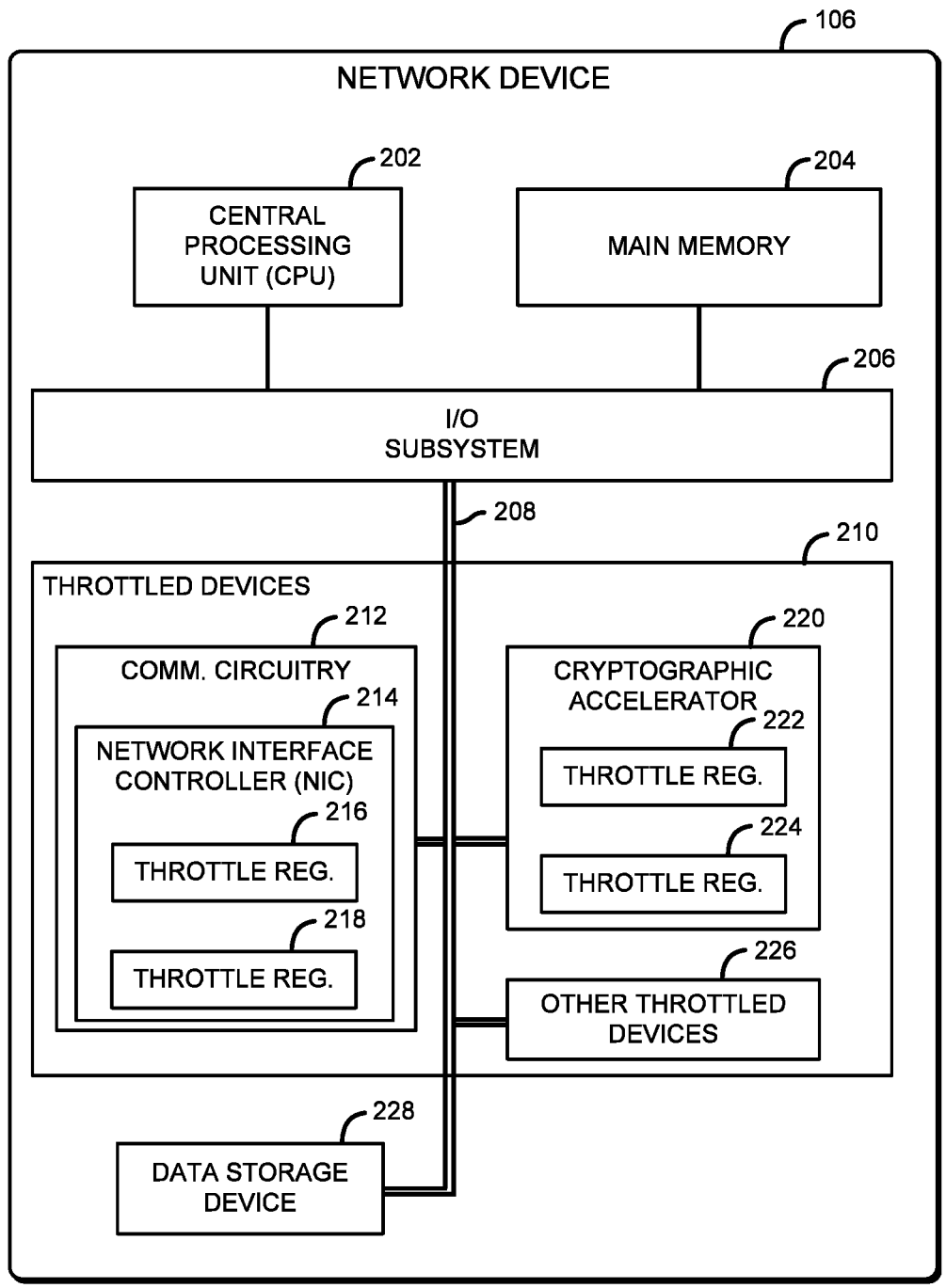
FIG. 2 is a simplified block diagram of at least one embodiment of the network device of the system of FIG. 1.

Each VM may perform the relevant processing of the network packets based on the service for which they are configured using a central processing unit (CPU) of the network device 106 (see, e.g., the CPU 202 of FIG. 2) and/or one or more throttled devices of the network device 106 (see, e.g., the throttled devices 210 of FIG. 2). In use, the network device 106 assigns initial throttle values to the various throttled devices 210 on a per device, per virtual machine basis. Further, as the various throttled devices 210 and the CPU 202 are utilized by the various virtual machines to perform their respective functions, the network device 106 dynamically adjusts the throttle values based on the various adjustment factors described above, to precisely balance processing loads in the network device 106, to prevent any one virtual machine or throttled device from monopolizing data bus bandwidth at the cost of other devices or virtual machines, and to maintain a more consistent and predictable quality-of-service.

The source endpoint node 102 may be embodied as any type of computation or computing device capable of performing the functions described herein, including, without limitation, a computer, a desktop computer, a smartphone, a workstation, a laptop computer, a notebook computer, a tablet computer, a mobile computing device, a wearable computing device, a network appliance, a web appliance, a distributed computing system, a processor-based system, and/or a consumer electronic device. Similarly, the destination endpoint node 108 may be embodied as any type of computation or computing device capable of performing the functions described herein, including, without limitation, a computer, a desktop computer, a smartphone, a workstation, a laptop computer, a notebook computer, a tablet computer, a mobile computing device, a wearable computing device, a network appliance, a web appliance, a distributed computing system, a processor-based system, and/or a consumer electronic device. Each of the source endpoint node 102 and the destination endpoint node 108 may include components commonly found in a computing device such as a processor, memory, input/output subsystem, data storage, communication circuitry, etc.

The network 104 may be embodied as any type of wired or wireless communication network, including cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), telephony networks, local area networks (LANs) or wide area networks (WANs), global networks (e.g., the Internet), or any combination thereof. Additionally, the network 104 may include any number of network devices 106 as needed to facilitate communication between the source endpoint node 102 and the destination endpoint node 108.

The network device 106 may be embodied as any type of computing device capable of facilitating wired and/or wireless network communications between the source endpoint node 102 and the destination endpoint node 108. For example, the network device 106 may be embodied as a server (e.g., stand-alone, rack-mounted, blade, etc.), a router, a switch, a network hub, an access point, a storage device, a compute device, a multiprocessor system, a network appliance (e.g., physical or virtual), or any other computing device capable of processing network packets. As shown in FIG. 2, an illustrative network device 106 includes a central processing unit (CPU) 202, a main memory 204, an input/output (I/O) subsystem 206, and a data bus 208 coupled to one or more of throttled devices 210. The illustrative network device also includes a data storage device 228. The throttled devices 210 include communication circuitry 212 that includes a network interface card (NIC) 214, a cryptographic accelerator 220, and/or other throttled devices 226. Of course, in other embodiments, the network device 106 may include other or additional components, such as those commonly found in a network device (e.g., virtualization services, drivers, operating systems, schedulers, etc.). Additionally, in some embodiments, one or more of the illustrative components may be incorporated in, or otherwise form a portion of, another component. For example, in some embodiments, the main memory 204, or portions thereof, may be incorporated in the CPU 202.

The CPU 202 may be embodied as any type of processor capable of performing the functions described herein. The CPU 202 may be embodied as a single or multi-core processor(s), digital signal processor, microcontroller, or other processor or processing/controlling circuit. The main memory 204 may be embodied as any type of volatile or non-volatile memory or data storage capable of performing the functions described herein. In operation, the main memory 204 may store various data and software used during operation of the network device 106 such as operating systems, applications, programs, libraries, and drivers.

The I/O subsystem 206 may be embodied as circuitry and/or components to facilitate input/output operations with the CPU 202, the main memory 204, the throttled devices 210, and other components of the network device 106. For example, the I/O subsystem 206 may be embodied as, or otherwise include, memory controller hubs, input/output control hubs, integrated sensor hubs, firmware devices, communication links (i.e., point-to-point links, bus links, wires, cables, light guides, printed circuit board traces, etc.), and/or other components and subsystems to facilitate the input/output operations. In some embodiments, the I/O subsystem 206 may form a portion of a system-on-a-chip (SoC) and be incorporated, along with one or more of the CPU 202, the main memory 204, the throttled devices 210, and other components of the network device 106, on a single integrated circuit chip.

The throttled devices 210 are coupled to the CPU 202, the main memory 204, and the I/O subsystem 206 via a data bus 208 and may be embodied as one or more devices and/or circuits capable of the functions described herein, including throttling their use of bandwidth of the data bus 208 in accordance with throttle values assigned by the network device 106. Each of the throttled devices 210 includes one or more throttle registers 216, 218, 222, and 224 to store corresponding throttle values. The throttle values may be embodied as numeric or other values or data that are indicative of an amount of bandwidth (i.e., actual amounts, percentages of total bandwidth, or other indicators) of the data bus 208 that each throttled device 210 is allowed to use. The throttle values are determined on a per device and per virtual machine basis, such that when a throttled device 210 is processing a network packet on behalf of one virtual machine, the throttle registers 216, 218 may store one set of throttle values, and when the same throttled device 210 is processing another network packet on behalf of a different virtual machine, the same throttle registers 216, 218 may store a different set of throttle values. In the illustrative embodiment, the data bus 208 is embodied as a peripheral component interconnect express (PCIe) bus, however, in other embodiments, the data bus 208 may be another type of data bus used for transmitting data between components of the network device 106.

The communication circuitry 212 may be embodied as any communication circuit, device, or collection thereof, capable of enabling communications over the network 104 between the network device 106 and the source endpoint node 102, another network device 106, and/or the destination endpoint node 108. The communication circuitry 212 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 212 includes a network interface controller (NIC) 214. The NIC 214 may be embodied as one or more add-in-boards, daughtercards, network interface cards, controller chips, chipsets, or other devices that may be used by the network device 106 to connect the source endpoint node 102, the destination endpoint node 108, and/or another network device 106. In the illustrative embodiment, the communication circuitry 212 and, in particular, the NIC 214, is a throttled device 210, as described above. Further, in the illustrative embodiment, the NIC 214 is coupled to the data bus 208 and includes the throttle registers 216, 218 to control an amount of bandwidth of the data bus 208 the NIC 214 may use at any given time. In other embodiments, the NIC 214 may be embodied as part of a system-on-a-chip (SoC) that includes one or more processors, or included on a multichip package that also contains one or more processors.

In some embodiments, the NIC 214 may include a local processor (not shown) and/or a local memory (not shown) that are both local to the NIC 214. In such embodiments, the local processor of the NIC 214 may be capable of performing one or more of the functions of the CPU 202 described herein. Additionally or alternatively, in such embodiments, the local memory of the NIC 214 may be integrated into one or more components of the network device 106 at the board level, socket level, chip level, and/or other levels.

The cryptographic accelerator 220 may be embodied as one or more of a field programmable gate array (FPGA), an application-specific integrated circuit (ASIC), a digital signal processor (DSP), an array of specialized processor cores for performing encryption and/or decryption, or other specialized circuitry to handle encryption and/or decryption tasks (e.g., network processing tasks). The cryptographic accelerator 220 may be capable of performing accelerated encryption and implement a specialized encryption instruction set (e.g., Intel Advanced Encryption Standard—New Instructions). For example, a virtual machine may use the cryptographic accelerator 220 to assist in securing web server traffic. In the illustrative embodiment, the cryptographic accelerator 220 is a throttled device 210. Further, in the illustrative embodiment, the cryptographic accelerator 220 is coupled to the data bus 208 and includes the throttle registers 222, 224 to control an amount of bandwidth of the data bus 208 the cryptographic accelerator 220 may use at any given time. In some embodiments, the network device 106 includes one or more other throttled devices 226, which are also coupled to the data bus 208 and include throttle registers to control an amount of bandwidth of the data bus 208 they may use at any given time. In some embodiments, the other throttled devices 226 may include accelerators for other types of tasks, such as compression and decompression and/or authentication.

The data storage device 228 may be embodied as any type of device or devices configured for short-term or long-term storage of data such as, for example, memory devices and circuits, memory cards, hard disk drives, solid-state drives, or other data storage devices. The data storage device 228 may include a system partition that stores data and firmware code for the network device 106. The data storage device 228 may also include an operating system partition that stores data files and executables for an operating system of the network device 106.

Figure 3:
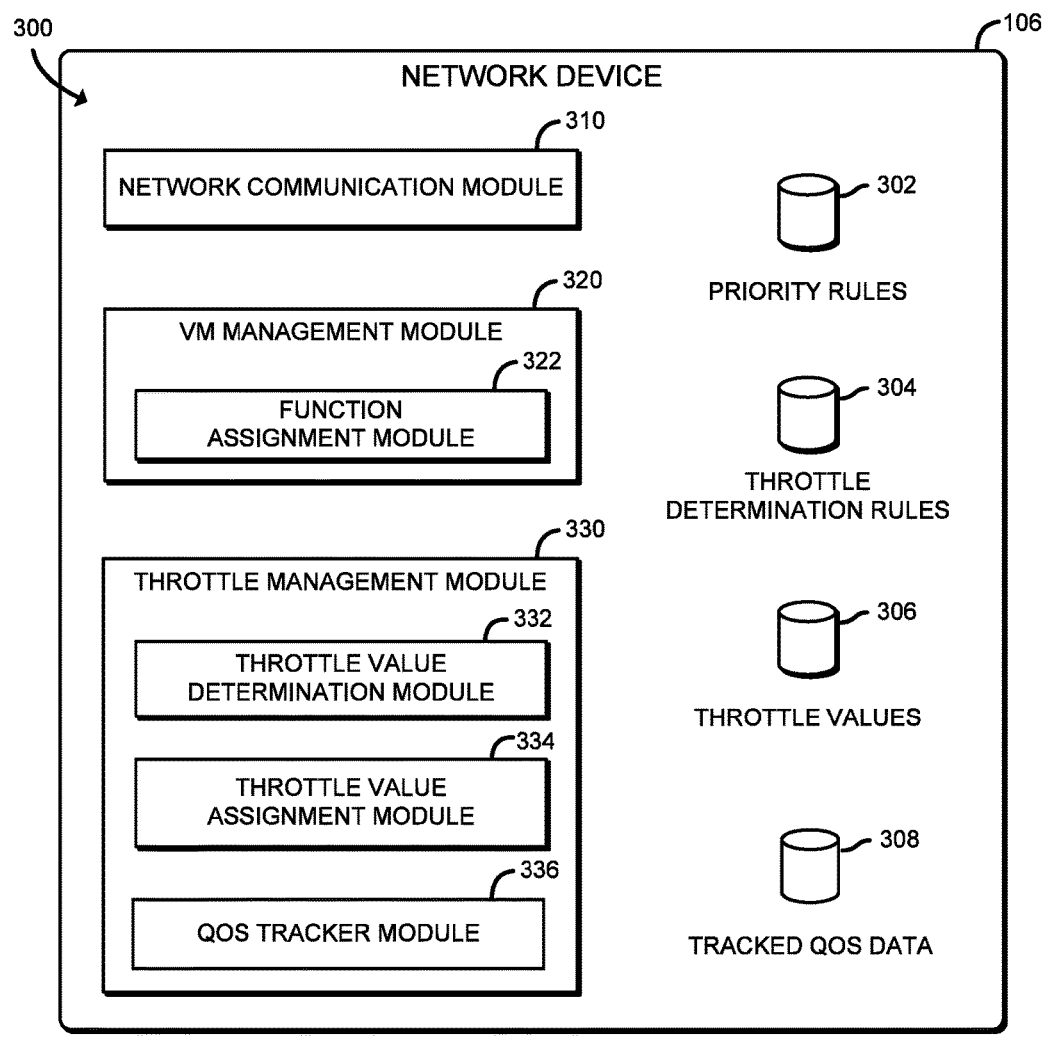
FIG. 3 is a simplified block diagram of at least one embodiment of an environment that may be established by the network device of FIG. 2.

Referring now to FIG. 3, in an embodiment, the network device 106 establishes an environment 300 during operation. The illustrative environment 300 includes a network communication module 310, a virtual machine management module 320, and a throttle management module 330. The various modules of the environment 300 may be embodied as hardware, firmware, software, or a combination thereof. As such, in some embodiments, one or more of the modules of the environment 300 may be embodied as circuitry or collection of electrical devices (e.g., a network communication circuit 310, a virtual machine management circuit 320, a throttle management circuit 330, etc.). It should be appreciated that, in such embodiments, one or more of the network communication circuit 310, the virtual machine management circuit 320, and the throttle management module 330 may form a portion of one or more of the CPU 202, the I/O subsystem 206, and/or other components of the network device 106. Additionally, in some embodiments, one or more of the illustrative modules may form a portion of another module and/or one or more of the illustrative modules may be independent of one another. Further, in some embodiments, one or more of the modules of the environment 300 may be embodied as virtualized hardware components or emulated architecture, which may be established and maintained by the CPU 202 or other components of the network device 106.

In the illustrative environment 300, the network device 106 additionally includes priority rules 302, throttle determination rules 304, throttle values 306, and tracked quality-of-service (QOS) data 308, each of which may be stored in the main memory 204 and/or the data storage device 228 of the network device 106. Further, each of the priority rules 302, throttle determination rules 304, throttle values 306, and tracked quality-of-service (QOS) data 308 may be accessed by the various modules and/or sub-modules of the network device 106. It should be appreciated that the network device 106 may include other components, sub-components, modules, sub-modules, and/or devices commonly found in a network device, which are not illustrated in FIG. 3 for clarity of the description.

The network communication module 310, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the network device 106, respectively. To do so, the network communication module 310 is configured to receive and process network packets from one computing device (e.g., the source endpoint node 102, another network device 106, the destination endpoint node 108) and to prepare and transmit network packets to another computing device (e.g., the source endpoint node 102, another network device 106, the destination endpoint node 108). Accordingly, in some embodiments, at least a portion of the functionality of the network communication module 310 may be performed by the communication circuitry 212, and more specifically by the NIC 214.

The virtual machine management module 320, which may be embodied as hardware, firmware, software, virtualized hardware, emulated architecture, and/or a combination thereof as discussed above, is configured to manage the virtual machines of the network device 106. For example, the illustrative virtual machine management module 320 is configured to initialize virtual machines within the network device 106 (e.g., for use in processing network packets) and to assign functions and associated priorities to each virtual machine. In the illustrative embodiment, the virtual machine management module 320 includes a function assignment module 322 that is configured to assign functions and associated priorities to each virtual machine. For example, one VM may be assigned the function of encrypting web traffic while another VM may be assigned the function of compressing and/or decompressing web traffic. In some embodiments, the function of one virtual machine may be to process network packets on behalf of a user of that VM, while the function of another VM is to process network packets on behalf of a different user. The users may be different customers of a cloud platform who have paid for different levels of service. In assigning the priorities, the illustrative VM management module 320 is configured to use the priority rules 302. The illustrative priority rules 302 are embodied as a set of priorities (i.e., indicators of importance) stored in association with functions that may be assigned to the virtual machines. Additionally, as described in more detail herein, the illustrative priority rules 302 include priorities associated with various sources of network packets, such that network packets originating from one source (e.g., IP address or domain) may have a different priority than other network packets originating from a different source. Accordingly, the illustrative VM management module 320 is configured to look up a priority in the priority rules 302, based on the function that has been assigned to each virtual machine, to obtain the corresponding priority to be assigned to the virtual machine. It should be appreciated that the function assignment module 322 of the virtual machine management module 320 may be embodied as hardware, firmware, software, virtualized hardware, emulated architecture, and/or a combination thereof.

The throttle management module 330, which may be embodied as hardware, firmware, software, virtualized hardware, emulated architecture, and/or a combination thereof as discussed above, is configured to determine throttle values for each of the throttled devices 210 during initialization of the virtual machines and to selectively increase or decrease the throttle values during operation of the virtual machines, based on the adjustment factors. To do so, the illustrative throttle management module 330 includes a throttle value determination module 332, a throttle value assignment module 334, and a quality-of-service (QOS) tracker module 336.

The throttle value determination module 332 of the throttle management module 330 is configured to compare the functions and priorities assigned to analyze the functions and priorities assigned to each virtual machine by the VM management module 320 and determine corresponding throttle values 306 for each throttled device 210 to be used by the virtual machine to perform the function. The illustrative throttle values 306 are indicators (e.g., numbers, strings, or other indicators) of an amount of bandwidth (i.e., actual amounts, percentages of total bandwidth, or other indicators) of the data bus 208 that each throttled device 210 is allowed to use. The throttle values may be embodied as an upper limit on a number of outstanding (i.e., not-yet-answered) requests to another device (e.g., to the main memory 204, to another throttled device 210, etc.) or a minimum limit on an amount of time to elapse between requests to another device (e.g., to the main memory 204, to another throttled device 210, etc.). Further, the illustrative throttle value determination module 332 is configured to adjust the throttle values on an ongoing basis, as the virtual machines perform their respective functions. In determining the initial and adjusted throttle values, the illustrative throttle value determination module 332 is configured to use the throttle determination rules 304. The illustrative throttle determination rules 304 are embodied as throttle values 306 stored in association with combinations of functions and priorities, for initially setting the throttle values for each throttled device 210 for each virtual machine. The illustrative throttle determination rules 304 also include adjustment amounts and/or formulas for determining adjustment amounts for throttle values 306 based on one or more adjustment factors. As described above, the adjustment factors may include whether a particular virtual machine is experiencing a malicious attack, a priority level associated with a source of the data packets processed by a particular virtual machine, and/or an impact that a particular virtual machine has had on the overall quality-of-service provided by the network device 106, as described in more detail herein.

The throttle value assignment module 334 of the throttle management module 330 is configured to assign the throttle values 306 to the respective throttled devices 210. In the illustrative embodiment, the throttle value assignment module 334 is configured to set the respective registers 216, 218, 222, 224 of the throttled devices 210 to the determined throttle values 306 in response to re-determinations or adjustments to the throttle values 306 by the throttle value determination module 332 and in response to each throttled device 210 switching contexts from performing a function for one virtual machine to performing a function for a different virtual machine.

The quality-of-service (QOS) tracker module 336 of the throttle management module 330 is configured to monitor and store a history of QOS metrics associated with the network device 106. In the illustrative embodiment, the QOS tracker module 336 is configured to store timestamps, one or more QOS metrics, and an identification of one or more of the virtual machines responsible for the QOS metrics in the tracked QOS data 308. Further, the QOS tracker module 336 may store an I/O bandwidth utilization value associated with the virtual machine responsible for the QOS metric at the given time associated with the timestamp. Accordingly, the tracked QOS data may indicate that a particular virtual machine increased the latency time of the network device beyond a predefined threshold value at a particular date, during a particular time period, and that one of the throttled devices 210, such as the cryptographic accelerator 220, monopolized the available bandwidth of the data bus 208 during that time. Using the throttle determination rules 304, the throttle value determination module 332 may be configured to determine that the throttle value associated with the cryptographic accelerator 220, when operating on behalf of that particular virtual machine, should be reduced by a specified amount. In response, the throttle value assignment module 334 may be configured to assign the reduced throttle value 306 to the cryptographic accelerator 220 for use when the cryptographic accelerator 220 performs subsequent operations on behalf of that virtual machine.

It should be appreciated that each of the throttle value determination module 332, the throttle value assignment module 334, and the QOS tracker module 336 of the throttle management module 330 may be separately embodied as hardware, firmware, software, virtualized hardware, emulated architecture, and/or a combination thereof. For example, the throttle value determination module 332 may be embodied as a hardware component, while the throttle value assignment module 334 and the QOS tracker module 336 are embodied as virtualized hardware components or as some other combination of hardware, firmware, software, virtualized hardware, emulated architecture, and/or a combination thereof.

Figure 4:
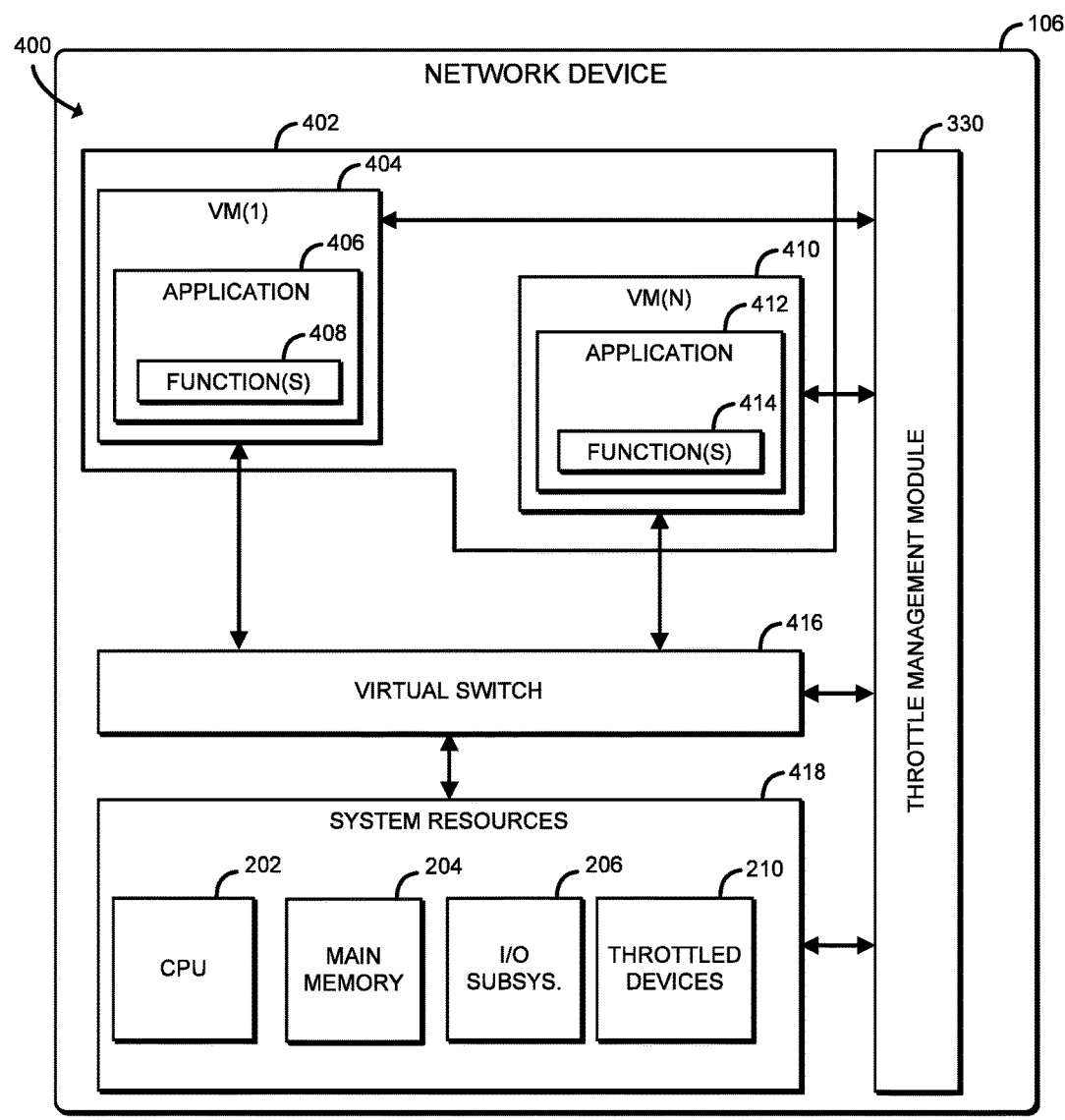
FIG. 4 is a simplified block diagram of another embodiment of an environment that may be established by the network device of FIG. 2.

Referring now to FIG. 4, an operational environment 400 of the network device 106 is shown. The illustrative operational environment 400 includes multiple virtual machines 402, the throttle management module 330 of FIG. 3, a virtual switch 416, and a set of system resources 418. In the illustrative operational environment 400, the network device 106 is executing one virtual machine, which is designated as VM(1) 404, and another virtual machine, which is designated as VM(N) 410 (i.e., the "Nth" virtual machine running on the network device 106, wherein "N" is a positive integer and designates one or more additional virtual machines running on the network device 106). Each of the VM(1) 404 and the VM(N) 410 include a corresponding application, including an application 406 associated with one or more functions 408, and an "Nth" application 412 associated with one or more other functions 414, respectively. It should be appreciated that one or more of the VMs 404, 410 may run more than one application. The applications 406, 412 may indicate any type of service or other network processing function presently being performed via the VMs 404, 410 on the network packets, such as inspection services, firewalls, encryption services, data compression services, authentication services, etc. In some embodiments, the VMs 404, 410 may be configured to function as a service function chain comprised of a number of VMs to perform certain services on the network packets based on various factors, such as type, flow, workload, destination, etc.

The virtual switch 416 may be configured to manage the internal data transfer of network traffic related information. In the illustrative embodiment, the virtual switch 416 is a logical switch initialized and managed by a NIC (e.g., the NIC 214 of FIG. 2) of the network device 106. It should be appreciated that, in other embodiments, the virtual switch 416 may be embodied by other hardware components and/or software. In some embodiments, the throttle management module 330 may receive mirrored and/or duplicated network packets that are to be processed internally to detect the presence of or changes to one or more adjustment factors.

For example, the throttle management module 330 may detect that one or more of the virtual machines 402 is receiving network packets from a relatively high priority source that may justify increasing the throttle values for the throttled devices 210 when operating on behalf of that virtual machine 402 to process those particular network packets. Additionally or alternatively, the throttle management module 330 may determine that one or more of the network packets are indicative of a malicious attack, such as a denial of service (DOS) attack, which may justify reducing the throttle values for the throttled device 210 when operating on behalf of the virtual machine 402 receiving such network packets, or that one or more of the virtual machines 402 is taking an inordinately large amount of time (i.e., in excess of a predefined threshold amount of time) to process network packets, which may be due to another one of the virtual machines 402 monopolizing the bandwidth of the data bus 208. Accordingly, the virtual switch 416 may be configured to facilitate the transfer of the mirrored and/or duplicated network traffic between the VMs 402 and the throttle management module 330.

The illustrative operational environment 400 additionally includes system resources 418 that include the various components of the network device 106, such as those components of the illustrative network device 106 of FIG. 2. The illustrative system resources include the CPU 202, the main memory 204, the I/O subsystem 206, and the throttled devices 210 of FIG. 2. As shown, the throttle management module 330 is communicatively coupled to the system resources 418, such that the throttle management module 330 can dynamically determine and assign the throttle values 306 on an ongoing basis.

Figure 5:
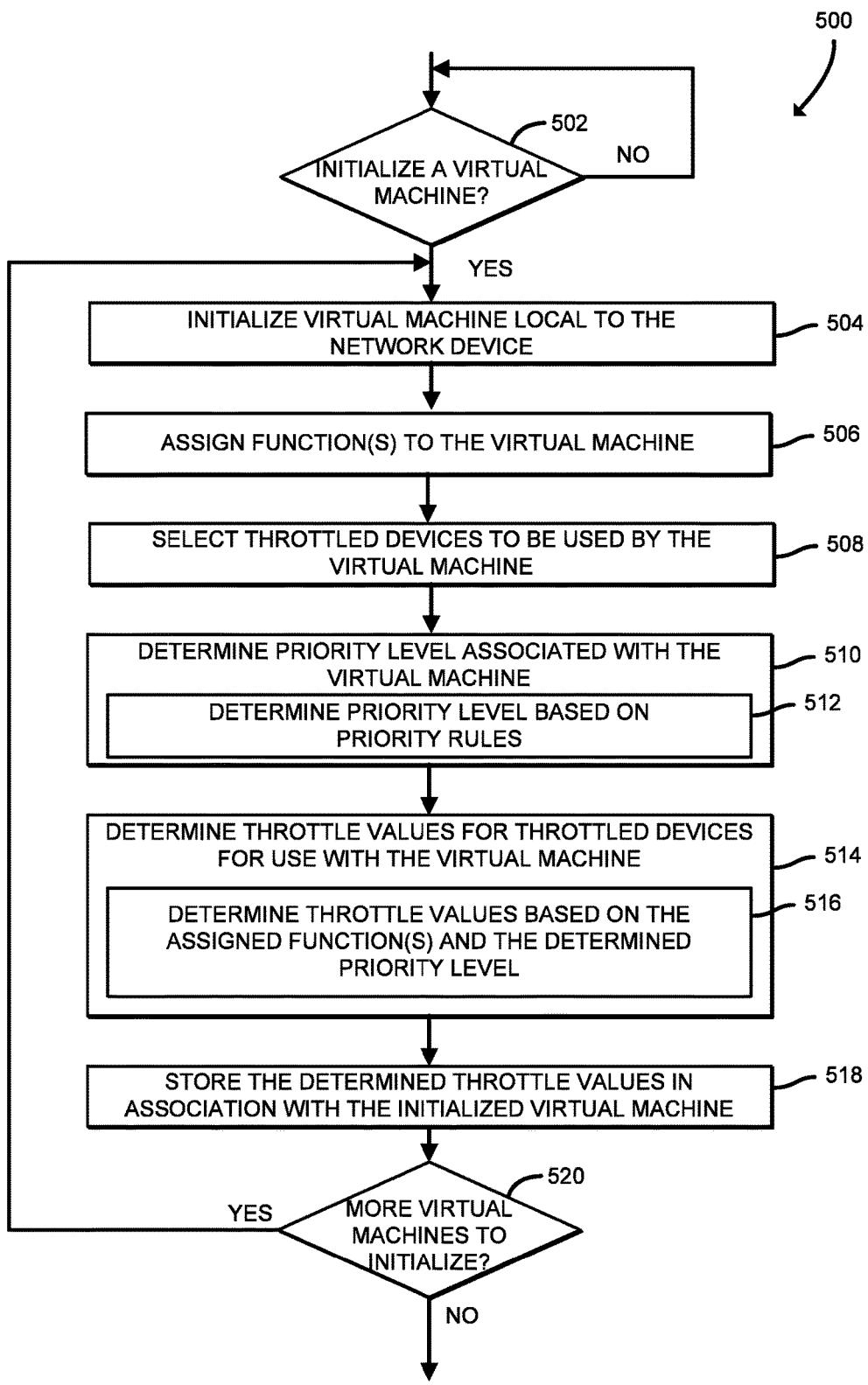
FIG. 5 is a simplified flow diagram of at least one embodiment of a method for initializing virtual machines of the network device of FIG. 2 to process network packets.

Referring now to FIG. 5, in use, the network device 106 may execute a method 500 for initializing the virtual machines 402 of the network device 106. The method 500 begins with block 502, in which the network device 106 determines whether a request to virtualize one or more network functions has been received. In other words, the network device 106 determines whether a request has been received to initialize one or more virtual machines 402 to perform one or more virtualized functions (e.g., inspection services, firewalls, encryption services, data compression services, authentication services, etc.). If the network device 106 determines that a request to begin virtualization of the network function(s) has not been received, the method loops back to block 502 to continue monitoring for the virtualization request. If the network device 106 determines that a request to begin virtualization has been received, the method 500 advances to block 504. In block 504, the network device 106 initializes a virtual machine 402 local to the network device 106. In block 506, the network device 106 assigns one or more functions (e.g., functions 408, 414) to the initialized virtual machine 402.

In block 508, the network device 106 selects the throttled devices 210 to be used by the virtual machine 402. In the illustrative embodiment, the network device 106 selects the throttled devices 210 based at least in part on the functions assigned to the virtual machine 402. For example, if the virtual machine 402 is to perform encryption functions on network packets, the network device 106 may assign both the NIC 214 and the cryptographic accelerator 220 to the virtual machine 402. Other functions may require other types of throttled devices 226. In block 510, the network device 106 determines a priority level associated with the virtual machine 402. As indicated in block 512, the illustrative network device 106 determines the priority level using the priority rules 302, as described with reference to FIG. 3. In block 514, the network device 106 determines the throttle values 306 for the throttled devices 210 for use with the virtual machine 402. In other words, the illustrative network device 106 determines potentially different throttle values 306 for each throttled device 210 determined to be usable by the virtual machine 402 that was initialized in block 504. In the illustrative embodiment, as indicated in block 516, the network device 106 determines the throttle values 306 based on the assigned function and priority level determined in block 512. As described above, the illustrative throttle determination rules 304 are structured such that throttle values 306 are stored in association with combinations of functions and priorities, thereby enabling the network device 106 to look up an appropriate throttle value 306 for a given function and priority combination.

In block 518, the network device 106 stores the determined throttle values 306 in association with the initialized virtual machine 402. Accordingly, when the throttled devices 210 selected in block 508 perform operations on behalf of the virtual machine 402, the network device 106 may assign the throttle values 306 (e.g., set the respective registers 216, 218, 222, 224 to the stored throttle values 306). In block 520, the network device 106 determines whether more virtual machines 402 are to be initialized. In other words, the network device 106 may determine that the initialized virtual machines 402 account for only a subset of a total set of functions to be virtualized, and accordingly, more virtual machines 402 should be initialized to perform the remaining functions in the set. If the network device 106 determines to initialize more virtual machines 402, the method 500 loops back to block 504 to initialize another virtual machine 402. Otherwise, the method 500 ends and/or the network device 106 performs other operations that are not pertinent to the method 500.

Figure 6:
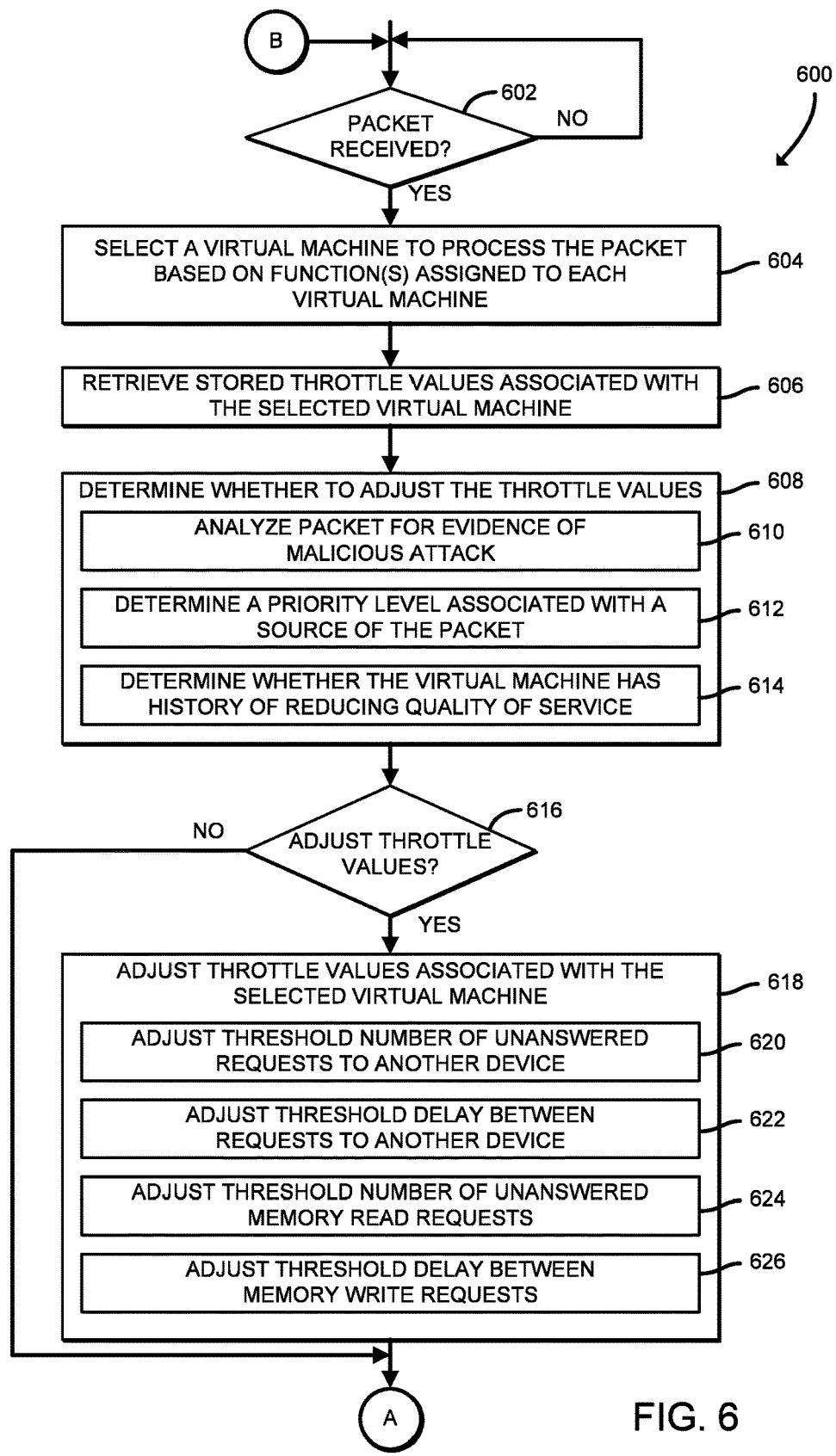

Referring now to FIG. 6, in use, the network device 106 may execute a method 600 for dynamically managing data bus bandwidth usage (i.e., bandwidth of the data bus 208) of the virtual machines 402 that were initialized in by the method 500. The method 600 begins with block 602, in which the network device 106 determines whether a network packet has been received, such as from the source endpoint node 102, another network device 106, or the destination endpoint node 108. In block 606, the network device 106 selects a virtual machine 402 to process the received packet based on the functions assigned to each virtual machine 402. For example, if the network packet includes data that is to be decrypted prior to further analysis, and function 408 of the virtual machine 404 is network packet decryption and/or encryption, the illustrative network device 106 may select the virtual machine 404 to process the network packet. In block 606, the network device 106 retrieves the stored throttle values 306 associated with the selected virtual machine 402 (e.g., the virtual machine 404 that is to decrypt and/or encrypt network packets). In block 608, the network device 106 determines whether to adjust the throttle values 306 to be used by the various throttled devices 210 when operating on behalf of the selected virtual machine 402 (e.g., the virtual machine 404). In doing so, as indicated in block 610, the network device 106 may analyze the network packet for evidence of a malicious attack, such as a denial of service attack (DOS) or other type of attack, such as by scanning the network packet for a predefined signature of such an attack. In response to detecting evidence of a malicious attack, the network device 106 may determine to reduce the throttle values 306 associated with the virtual machine 402 (e.g., the virtual machine 404) to prevent the attack from affecting the other virtual machines 402 of the network device 106.

As indicated in block 612, the illustrative network device 106 may determine a priority level associated with a source of the network packet based on the priority rules 302. For example, the network device 106 may determine that a source internet protocol (IP) address specified in the network packet is in a predefined list of high priority sources. Accordingly, the network device 106 may determine that the throttle values 306 associated with the virtual machine 402 (e.g., the virtual machine 404) should be adjusted to allow the throttled devices 210 to use more bandwidth of the data bus 208 in processing the network packet for the virtual machine 402 (e.g., the virtual machine 404). As indicated in block 614, the network device 106 may determine whether the virtual machine 402 (e.g., the virtual machine 404) has a history of reducing the QOS of the network device 106. For example, the network device 106 may analyze the tracked QOS data 308 and determine that the virtual machine 404 has monopolized the bandwidth of the data bus 208 in the past, causing functions of other virtual machines 402 (e.g., the virtual machine 410) to be performed at an unacceptably slow speed, thereby increasing latency and negatively affecting the QOS of the network device 106. In such a scenario, the network device 106 may determine to decrease the throttle values 306 for the virtual machine 404.

In block 616, the network device 106 determines whether the analysis in block 608 lead to a determination to adjust the throttle values for a virtual machine 402 (e.g., the virtual machine 404). If not, the method advances to block 628 to assign the received network packet to the selected virtual machine 402 (e.g., the virtual machine 404) for processing. However, if the network device 106 determines that the analysis in block 608 lead to a determination to adjust the throttle values 306 for a virtual machine 402 (e.g., the virtual machine 404), the method 600 advances to block 618 in which the network device 106 adjusts the throttle values associated with the selected virtual machine 402 (e.g., the virtual machine 404). In doing so, as indicated in block 620, the illustrative network device 106 may adjust a throttle value 306 that indicates a threshold number of unanswered requests that may be posted to another device (e.g., another throttled device 210 or one of the other system resources 418). Similarly, as indicated in block 622, the illustrative network device 106 may adjust a threshold delay (i.e., an amount of time that should elapse) between requests from one of the throttled devices 210 to any of the other devices (e.g., another throttled device 210 or one of the other system resources 418).

As indicated in block 624, the illustrative network device 106 may adjust a threshold number of unanswered memory read requests (i.e., an upper limit on an amount of not-yet-answered requests to read data from the main memory 204). Similarly, as indicated in block 626, the illustrative network device 106 may adjust a threshold delay between write requests to the main memory 204 for a throttled device 210. In block 628 of FIG. 7, the network device 106 assigns the received network packet to the selected virtual machine 402 (e.g., the virtual machine 404) for processing. In block 630, the network device 106 assigns the throttle values 306 to the throttled devices 210 to be used by the selected virtual machine 402 (e.g., the virtual machine 404). In the illustrative embodiment, the network device 106 sets one or more of the registers 216, 218, 222, 224 of the appropriate throttled devices 210 (i.e., the throttled devices 210 that were selected in block 508 of FIG. 5) to the corresponding throttle values 306.

In block 632, the network device 106 processes the received network packet for the selected virtual machine 402 using the throttled devices 210 that were selected in block 508 of FIG. 5. In doing so, the throttled devices 210 perform the assigned function of the virtual machine 402 subject to the throttle values 306 that were assigned in block 630. As an example, the cryptographic accelerator 220 may determine that the throttle register 222 contains a throttle value 306 that limits the number of unanswered read requests to the main memory 204, determine that the current number of unanswered read requests that have been transmitted to the main memory 204 is equal to that throttle value 306, and wait until at least one of the memory read requests is answered before transmitting another read request to the main memory 204. As another example, the cryptographic accelerator 220 may determine that the throttle register 224 contains a throttle value that specifies a time period that should elapse between requests to a system resource, such as the main memory 204. In the example, the cryptographic accelerator may further determine that although the limit on the allowable number of unanswered requests to the main memory 204 has not been reached, the cryptographic accelerator 220 transmitted its previous request to the main memory 204 so recently that the time period specified in the throttle register 224 has not yet elapsed. Accordingly, the cryptographic accelerator 220 may wait until the time period stored in the throttle register 224 has elapsed before transmitting the next request to the main memory 204. The above are non-limiting illustrative examples of the throttled devices 210 performing the function of the virtual machine 402 subject to the their assigned throttle values 306. By performing functions subject to the throttle values 306, the network device 106 may prevent the bandwidth of the data bus 208 from being monopolized by one throttled device 210, to the detriment of other system resources 418 that use the data bus 208.

In block 634, the network device 106 monitors the quality of service of the network device 106. In the illustrative embodiment, the network device 106 may monitor the bandwidth usage of the data bus 208 by the throttled devices 210, as indicated in block 636. In the illustrative embodiment, the network device 106 may compare the theoretical maximum bandwidth of the data bus 208 (e.g., a predefined number of GB/s) to an amount of data passing through the data bus 208 in association with each throttled device 210 (e.g., requests or responses containing identifiers associated with each of the throttled devices 210) to determine what percentage or portion of the maximum bandwidth each throttled device 210 is using. Additionally or alternatively, the network device 106 may measure a latency (e.g., amount of time that elapses in performing a function on one or more network packets) of the network device 106, as indicated in block 638. In block 640, the network device 106 determines whether processing of the network packet is complete. If not, the method 600 loops back to block 632 to continue processing the network packet for the virtual machine 402 using the throttled devices 210. Otherwise, the method 600 advances to block 642 in which the network device 106 stores the throttle values 306 associated with the virtual machine 402. By storing the throttle values 306 for the virtual machine 402, the network device 106 may later read the stored throttle values 306 when another network packet is assigned to the same virtual machine 402 to be processed by the throttled devices 210. In block 644, the network device 106 transmits one or more output packets (i.e., to the destination endpoint node 108) based on completion of the function assigned to the virtual machine 402. Subsequently, the method 600 loops back to block 602 of FIG. 6 to await another network packet.

While the blocks of the method 600 have been described in sequence, it should be understood that many of the blocks may be performed in parallel with other blocks. For example, the network device 106 may receive, process, and transmit data packets in parallel with the assignment and adjustment of throttle values 306 for various throttled devices 210 as they perform operations on behalf of the virtual machines 402.

It should be appreciated that at least a portion of the methods 500 and 600 may be embodied as various instructions stored on a computer-readable media, which may be executed by the CPU 202, one or more of the throttled devices 210, and/or other components of the network device 106 to cause the network device 106 to perform the methods 500 and 600. The computer-readable media may be embodied as any type of media capable of being read by the network device 106 including, but not limited to, the main memory 204, the data storage device 228, a local memory (not shown) of the NIC 214 of the communication circuitry 212, other memory or data storage devices of the network device 106, portable media readable by a peripheral device of the network device 106, and/or other media.

EXAMPLES

Illustrative examples of the technologies disclosed herein are provided below. An embodiment of the technologies may include any one or more, and any combination of, the examples described below.

Example 1 includes a network device to dynamically manage data bus bandwidth usage of virtual machines, the network device comprising a data bus; one or more processors coupled to the data bus; one or more throttled devices coupled to the data bus, wherein each throttled device is configured to use no more than an amount of data bus bandwidth associated with at least one throttle value assigned to the corresponding throttled device; and one or more memory devices having stored therein a plurality of instructions that, when executed by the one or more processors, cause the network device to assign a first function to a first virtual machine and a second function to a second virtual machine of the network device, wherein each of the first virtual machine and the second virtual machine utilizes one or more of the throttled devices to perform the assigned first function or second function; determine, for each of the one or more throttled devices utilized by the first virtual machine to perform the first function, a first throttle value based on the first function; determine, for each of the one or more throttled devices utilized by the second virtual machine to perform the second function, a second throttle value based on the second function; perform, by the first virtual machine, the first function subject to the first throttle value; and perform, by the second virtual machine, the second function subject to the second throttle value.

Example 2 includes the subject matter of Example 1, and wherein to determine the first throttle value further comprises to determine the first throttle value based additionally on a first priority associated with the first virtual machine; and to determine the second throttle value further comprises to determine the second throttle value based additionally on a second priority associated with the second virtual machine, wherein the first priority is different from the second priority.

Example 3 includes the subject matter of any of Examples 1 and 2, and wherein to determine the first throttle value comprises to determine a threshold number of unanswered memory read requests.

Example 4 includes the subject matter of any of Examples 1-3, and wherein to determine the first throttle value comprises to determine a threshold delay between memory write requests.

Example 5 includes the subject matter of any of Examples 1-4, and wherein to determine the first throttle value comprises to determine a threshold number of unanswered requests to another one of the throttled devices.

Example 6 includes the subject matter of any of Examples 1-5, and wherein to determine the first throttle value comprises to determine a threshold delay between sequential requests to another one of the throttled devices.

Example 7 includes the subject matter of any of Examples 1-6, and wherein the plurality of instructions, when executed by the one or more processors, further cause the network device to assign a first network packet to the first virtual machine and a second network packet to the second virtual machine; wherein to perform the first function subject to the first throttle value comprises to perform the first function by the first virtual machine, based on the first network packet, subject to the first throttle value; and wherein to perform the second function subject to the second throttle value comprises to perform the second function by the second virtual machine, based on the second network packet, subject to the second throttle value.

Example 8 includes the subject matter of any of Examples 1-7, and wherein the plurality of instructions, when executed by the one or more processors, further cause the network device to analyze the first network packet; and adjust the first throttle value based on the analysis of the first network packet.

Example 9 includes the subject matter of any of Examples 1-8, and wherein to analyze the first network packet comprises to determine whether the first network packet is associated with a malicious attack; and to adjust the first throttle value comprises to reduce the first throttle value in response to a determination that the first network packet is associated with a malicious attack.

Example 10 includes the subject matter of any of Examples 1-9, and wherein to analyze the first network packet comprises to determine a priority level associated with a source of the first network packet; and to adjust the first throttle value comprises to selectively increase or decrease the first throttle value based on the determined priority level.

Example 11 includes the subject matter of any of Examples 1-10, and wherein the plurality of instructions, when executed by the one or more processors, further cause the network device to track a quality-of-service associated with the network device; determine whether the first virtual machine has historically reduced the quality of service; and reduce, in response to a determination that the first virtual machine has historically reduced the quality of service, the first throttle value.

Example 12 includes the subject matter of any of Examples 1-11, and wherein the data bus is a peripheral component interconnect express (PCIe) bus.

Example 13 includes the subject matter of any of Examples 1-12, and wherein to perform the first function subject to the first throttle value comprises to set at least one register in each of the one or more throttled devices utilized by the first virtual machine to perform the first function subject to the first throttle value; and to perform the second function subject to the second throttle value comprises to set at least one register in each of the one or more throttled devices utilized by the second virtual machine to perform the second function subject to the second throttle value.

Example 14 includes the subject matter of any of Examples 1-13, and wherein the first throttle value determined for a first throttled device utilized by the first virtual machine to perform the first function is different from the first throttle value determined for a second throttled device utilized by the first virtual machine to perform the first function.

Example 15 includes the subject matter of any of Examples 1-14, and wherein the first throttle value is different from the second throttle value.

Example 16 includes the subject matter of any of Examples 1-15, and wherein to assign a first function to the first virtual machine and a second function to the second virtual machine comprises to assign a second function that is different than the first function to the second virtual machine.

Example 17 includes a method for dynamically managing data bus bandwidth usage of virtual machines of a network device, the method comprising assigning, by the network device, a first function to a first virtual machine and a second function to a second virtual machine of the network device, wherein each of the first virtual machine and the second virtual machine utilizes one or more throttled devices to perform the assigned first function or second function, wherein each throttled device is configured to use no more than an amount of data bus bandwidth associated with at least one throttle value assigned to the corresponding throttled device; determining, by the network device, for each of the one or more throttled devices utilized by the first virtual machine to perform the first function, a first throttle value based on the first function; determining, by the network device, for each of the one or more throttled devices utilized by the second virtual machine to perform the second function, a second throttle value based on the second function; performing, by the first virtual machine of the network device, the first function subject to the first throttle value; and performing, by the second virtual machine of the network device, the second function subject to the second throttle value.

Example 18 includes the subject matter of Example 17, and wherein determining the first throttle value further comprises determining the first throttle value based additionally on a first priority associated with the first virtual machine; and determining the second throttle value further comprises determining the second throttle value based additionally on a second priority associated with the second virtual machine, wherein the first priority is different from the second priority.

Example 19 includes the subject matter of any of Examples 17 and 18, and wherein determining the first throttle value comprises determining a threshold number of unanswered memory read requests.

Example 20 includes the subject matter of any of Examples 17-19, and wherein determining the first throttle value comprises determining a threshold delay between memory write requests.

Example 21 includes the subject matter of any of Examples 17-20, and wherein determining the first throttle value comprises determining a threshold number of unanswered requests to another one of the throttled devices.

Example 22 includes the subject matter of any of Examples 17-21, and wherein determining the first throttle value comprises determining a threshold delay between sequential requests to another one of the throttled devices.

Example 23 includes the subject matter of any of Examples 17-22, and further including assigning, by the network device, a first network packet to the first virtual machine and a second network packet to the second virtual machine; wherein performing the first function subject to the first throttle value comprises performing the first function by the first virtual machine, based on the first network packet, subject to the first throttle value; and wherein performing the second function subject to the second throttle value comprises performing the second function by the second virtual machine, based on the second network packet, subject to the second throttle value.

Example 24 includes the subject matter of any of Examples 17-23, and further including analyzing, by the network device, the first network packet; and adjusting, by the network device, the first throttle value based on the analysis of the first network packet.

Example 25 includes the subject matter of any of Examples 17-24, and wherein analyzing the first network packet comprises determining whether the first network packet is associated with a malicious attack; and adjusting the first throttle value comprises reducing the first throttle value in response to a determination that the first network packet is associated with a malicious attack.

Example 26 includes the subject matter of any of Examples 17-25, and wherein analyzing the first network packet comprises determining a priority level associated with a source of the first network packet; and adjusting the first throttle value comprises selectively increasing or decreasing the first throttle value based on the determined priority level.

Example 27 includes the subject matter of any of Examples 17-26, and further including tracking, by the network device, a quality-of-service associated with the network device; determining, by the network device, whether the first virtual machine has historically reduced the quality of service; and reducing, by the network device and in response to a determination that the first virtual machine has historically reduced the quality of service, the first throttle value.

Example 28 includes the subject matter of any of Examples 17-27, and wherein performing the first function subject to the first throttle value comprises setting at least one register in each of the one or more throttled devices utilized by the first virtual machine to perform the first function subject to the first throttle value; and performing the second function subject to the second throttle value comprises setting at least one register in each of the one or more throttled devices utilized by the second virtual machine to perform the second function subject to the second throttle value.

Example 29 includes the subject matter of any of Examples 17-28, and wherein determining the first throttle value comprises determining one first throttle value for a first throttled device utilized by the first virtual machine to perform the first function; and determining another first throttle value for a second throttled device utilized by the first virtual machine to perform the first function, wherein the one first throttle value is different than the other first throttle value.

Example 30 includes the subject matter of any of Examples 17-29, and wherein determining a second throttle value comprises determining a second throttle value that is different from the first throttle value.

Example 31 includes the subject matter of any of Examples 17-30, and wherein assigning a second function to the second virtual machine comprises assigning a second function that is different than the first function to the second virtual machine.

Example 32 includes a network device comprising one or more processors; and a memory having stored therein a plurality of instructions that when executed by the one or more processors cause the network device to perform the method of any of Examples 17-31.

Example 33 includes one or more machine readable storage media comprising a plurality of instructions stored thereon that in response to being executed result in a network device performing the method of any of Examples 17-31.

Example 34 includes a network device to dynamically manage data bus bandwidth usage of virtual machines, the network device comprising one or more throttled devices coupled to a data bus, wherein each throttled device is configured to use no more than an amount of data bus bandwidth associated with at least one throttle value assigned to the corresponding throttled device; virtual machine management circuitry to assign a first function to a first virtual machine and a second function to a second virtual machine of the network device, wherein each of the first virtual machine and the second virtual machine utilizes one or more of the throttled devices to perform the assigned first function or second function; and throttle management module circuitry to (i) determine, for each of the one or more throttled devices utilized by the first virtual machine to perform the first function, a first throttle value based on the first function; (ii) determine, for each of the one or more throttled devices utilized by the second virtual machine to perform the second function, a second throttle value based on the second function; (iii) perform, with the first virtual machine, the first function subject to the first throttle value; and (iv) perform, with the second virtual machine, the second function subject to the second throttle value.

Example 35 includes the subject matter of Example 34, and wherein to determine the first throttle value further comprises to determine the first throttle value based additionally on a first priority associated with the first virtual machine; and to determine the second throttle value further comprises to determine the second throttle value based additionally on a second priority associated with the second virtual machine, wherein the first priority is different from the second priority.

Example 36 includes the subject matter of any of Examples 34 and 35, and wherein to determine the first throttle value comprises to determine a threshold number of unanswered memory read requests.

Example 37 includes the subject matter of any of Examples 34-36, and wherein to determine the first throttle value comprises to determine a threshold delay between memory write requests.

Example 38 includes the subject matter of any of Examples 34-37, and wherein to determine the first throttle value comprises to determine a threshold number of unanswered requests to another one of the throttled devices.

Example 39 includes the subject matter of any of Examples 34-38, and wherein to determine the first throttle value comprises to determine a threshold delay between sequential requests to another one of the throttled devices.

Example 40 includes the subject matter of any of Examples 34-39, and wherein the virtual machine management circuitry is further to assign a first network packet to the first virtual machine and a second network packet to the second virtual machine; wherein to perform the first function subject to the first throttle value comprises to perform the first function with the first virtual machine, based on the first network packet, subject to the first throttle value; and wherein to perform the second function subject to the second throttle value comprises to perform the second function with the second virtual machine, based on the second network packet, subject to the second throttle value.

Example 41 includes the subject matter of any of Examples 34-40, and wherein the throttle management circuitry is further to analyze the first network packet; and adjust the first throttle value based on the analysis of the first network packet.

Example 42 includes the subject matter of any of Examples 34-41, and wherein to analyze the first network packet comprises to determine whether the first network packet is associated with a malicious attack; and to adjust the first throttle value comprises to reduce the first throttle value in response to a determination that the first network packet is associated with a malicious attack.

Example 43 includes the subject matter of any of Examples 34-42, and wherein to analyze the first network packet comprises to determine a priority level associated with a source of the first network packet; and to adjust the first throttle value comprises to selectively increase or decrease the first throttle value based on the determined priority level.

Example 44 includes the subject matter of any of Examples 34-43, and wherein the throttle management circuitry is further to track a quality-of-service associated with the network device; determine whether the first virtual machine has historically reduced the quality of service; and reduce, in response to a determination that the first virtual machine has historically reduced the quality of service, the first throttle value.

Example 45 includes the subject matter of any of Examples 34-44, and wherein to perform the first function subject to the first throttle value comprises to set at least one register in each of the one or more throttled devices utilized by the first virtual machine to perform the first function subject to the first throttle value; and to perform the second function subject to the second throttle value comprises to set at least one register in each of the one or more throttled devices utilized by the second virtual machine to perform the second function subject to the second throttle value.

Example 46 includes the subject matter of any of Examples 34-45, and wherein the first throttle value determined for a first throttled device utilized by the first virtual machine to perform the first function is different from the first throttle value determined for a second throttled device utilized by the first virtual machine to perform the first function.

Example 47 includes the subject matter of any of Examples 34-46, and wherein the first throttle value is different from the second throttle value.

Example 48 includes the subject matter of any of Examples 34-47, and wherein to assign a first function to the first virtual machine and a second function to the second virtual machine comprises to assign a second function that is different than the first function to the second virtual machine.

Example 49 includes a network device to dynamically manage data bus bandwidth usage of virtual machines, the network device comprising means for assigning a first function to a first virtual machine and a second function to a second virtual machine of the network device, wherein each of the first virtual machine and the second virtual machine utilizes one or more throttled devices to perform the assigned first function or second function, wherein each throttled device is configured to use no more than an amount of data bus bandwidth associated with at least one throttle value assigned to the corresponding throttled device; means for determining for each of the one or more throttled devices utilized by the first virtual machine to perform the first function, a first throttle value based on the first function; means for determining for each of the one or more throttled devices utilized by the second virtual machine to perform the second function, a second throttle value based on the second function; means for performing, with the first virtual machine, the first function subject to the first throttle value; and means for performing, with the second virtual machine, the second function subject to the second throttle value.

Example 50 includes the subject matter of Example 49, and wherein the means for determining the first throttle value further comprises means for determining the first throttle value based additionally on a first priority associated with the first virtual machine; and the means for determining the second throttle value further comprises means for determining the second throttle value based additionally on a second priority associated with the second virtual machine, wherein the first priority is different from the second priority.

Example 51 includes the subject matter of any of Examples 49 and 50, and wherein the means for determining the first throttle value comprises means for determining a threshold number of unanswered memory read requests.

Example 52 includes the subject matter of any of Examples 49-51, and wherein the means for determining the first throttle value comprises means for determining a threshold delay between memory write requests.

Example 53 includes the subject matter of any of Examples 49-52, and wherein the means for determining the first throttle value comprises means for determining a threshold number of unanswered requests to another one of the throttled devices.

Example 54 includes the subject matter of any of Examples 49-53, and wherein the means for determining the first throttle value comprises means for determining a threshold delay between sequential requests to another one of the throttled devices.

Example 55 includes the subject matter of any of Examples 49-54, and further including means for assigning a first network packet to the first virtual machine and a second network packet to the second virtual machine; wherein the means for performing the first function subject to the first throttle value comprises means for performing the first function by the first virtual machine, based on the first network packet, subject to the first throttle value; and wherein the means for performing the second function subject to the second throttle value comprises means for performing the second function by the second virtual machine, based on the second network packet, subject to the second throttle value.

Example 56 includes the subject matter of any of Examples 49-55, and further including means for analyzing the first network packet; and means for adjusting the first throttle value based on the analysis of the first network packet.

Example 57 includes the subject matter of any of Examples 49-56, and wherein the means for analyzing the first network packet comprises means for determining whether the first network packet is associated with a malicious attack; and the means for adjusting the first throttle value comprises means for reducing the first throttle value in response to a determination that the first network packet is associated with a malicious attack.

Example 58 includes the subject matter of any of Examples 49-57, and wherein the means for analyzing the first network packet comprises means for determining a priority level associated with a source of the first network packet; and the means for adjusting the first throttle value comprises means for selectively increasing or decreasing the first throttle value based on the determined priority level.

Example 59 includes the subject matter of any of Examples 49-58, and further including means for tracking a quality-of-service associated with the network device; means for determining whether the first virtual machine has historically reduced the quality of service; and means for reducing, in response to a determination that the first virtual machine has historically reduced the quality of service, the first throttle value.

Example 60 includes the subject matter of any of Examples 49-59, and wherein the means for performing the first function subject to the first throttle value comprises means for setting at least one register in each of the one or more throttled devices utilized by the first virtual machine to perform the first function subject to the first throttle value; and the means for performing the second function subject to the second throttle value comprises means for setting at least one register in each of the one or more throttled devices utilized by the second virtual machine to perform the second function subject to the second throttle value.

Example 61 includes the subject matter of any of Examples 49-60, and wherein the first throttle value determined for a first throttled device utilized by the first virtual machine to perform the first function is different from the first throttle value determined for a second throttled device utilized by the first virtual machine to perform the first function.

Example 62 includes the subject matter of any of Examples 49-61, and wherein the first throttle value is different from the second throttle value.

Example 63 includes the subject matter of any of Examples 49-62, and wherein the means for assigning a first function to the first virtual machine and a second function to the second virtual machine comprises means for assigning a second function that is different than the first function to the second virtual machine.

The invention claimed is:

1. A network device to dynamically manage data bus bandwidth usage of virtual machines, the network device comprising:
   a data bus that is internal to the network device;
   one or more processors coupled to the data bus;
   one or more throttled devices coupled to the data bus, wherein each throttled device is configured to use no more than an amount of data bus bandwidth of the data bus internal to the network device, wherein the data bus bandwidth is associated with at least one throttle value assigned to the corresponding throttled device; and
   one or more memory devices having stored therein a plurality of instructions that, when executed by the one or more processors, cause the network device to:
      assign a first function to a first virtual machine and a second function to a second virtual machine of the network device, wherein each of the first virtual machine and the second virtual machine utilizes one or more of the throttled devices to perform the assigned first function or second function;
      determine, for each of the one or more throttled devices utilized by the first virtual machine to perform the first function, a first throttle value based on the first function;
      determine, for each of the one or more throttled devices utilized by the second virtual machine to perform the second function, a second throttle value based on the second function;
      perform, by the first virtual machine, the first function subject to the first throttle value; and
      perform, by the second virtual machine, the second function subject to the second throttle value.

2. The network device of claim 1, wherein:
   to determine the first throttle value further comprises to determine the first throttle value based additionally on a first priority associated with the first virtual machine; and
   to determine the second throttle value further comprises to determine the second throttle value based additionally on a second priority associated with the second virtual machine, wherein the first priority is different from the second priority.

3. The network device of claim 1, wherein to determine the first throttle value comprises to determine a threshold number of unanswered memory read requests.

4. The network device of claim 1, wherein to determine the first throttle value comprises to determine a threshold delay between memory write requests.

5. The network device of claim 1, wherein to determine the first throttle value comprises to determine a threshold number of unanswered requests to another one of the throttled devices.

6. The network device of claim 1, wherein to determine the first throttle value comprises to determine a threshold delay between sequential requests to another one of the throttled devices.

7. The network device of claim 1, wherein the plurality of instructions, when executed by the one or more processors, further cause the network device to:
   assign a first network packet to the first virtual machine and a second network packet to the second virtual machine;
   wherein to perform the first function subject to the first throttle value comprises to perform the first function by the first virtual machine, based on the first network packet, subject to the first throttle value; and
   wherein to perform the second function subject to the second throttle value comprises to perform the second function by the second virtual machine, based on the second network packet, subject to the second throttle value.

8. The network device of claim 7, wherein the plurality of instructions, when executed by the one or more processors, further cause the network device to:
   analyze the first network packet; and
   adjust the first throttle value based on the analysis of the first network packet.

9. The network device of claim 8, wherein:
   to analyze the first network packet comprises to determine whether the first network packet is associated with a malicious attack; and
   to adjust the first throttle value comprises to reduce the first throttle value in response to a determination that the first network packet is associated with a malicious attack.

10. The network device of claim 8, wherein:
  to analyze the first network packet comprises to determine a priority level associated with a source of the first network packet; and
  to adjust the first throttle value comprises to selectively increase or decrease the first throttle value based on the determined priority level.

11. The network device of claim 1, wherein the plurality of instructions, when executed by the one or more processors, further cause the network device to:
  track a quality-of-service associated with the network device;
  determine whether the first virtual machine has historically reduced the quality of service; and
  reduce, in response to a determination that the first virtual machine has historically reduced the quality of service, the first throttle value.

12. The network device of claim 1, wherein the data bus is a peripheral component interconnect express (PCIe) bus.

13. One or more non-transitory machine readable storage media comprising a plurality of instructions stored thereon that in response to being executed, cause a network device to:
  assign a first function to a first virtual machine and a second function to a second virtual machine of the network device, wherein each of the first virtual machine and the second virtual machine utilizes one or more throttled devices to perform the assigned first function or second function, wherein each throttled device is configured to use no more than an amount of data bus bandwidth of a data bus that is internal to the network device, wherein the data bus bandwidth is associated with at least one throttle value assigned to the corresponding throttled device;
  determine for each of the one or more throttled devices utilized by the first virtual machine to perform the first function, a first throttle value based on the first function;
  determine for each of the one or more throttled devices utilized by the second virtual machine to perform the second function, a second throttle value based on the second function;
  perform, with the first virtual machine of the network device, the first function subject to the first throttle value; and
  perform, with the second virtual machine of the network device, the second function subject to the second throttle value.

14. The one or more non-transitory machine-readable storage media of claim 13, wherein:
  to determine the first throttle value further comprises to determine the first throttle value based additionally on a first priority associated with the first virtual machine; and
  to determine the second throttle value further comprises to determine the second throttle value based additionally on a second priority associated with the second virtual machine, wherein the first priority is different from the second priority.

15. The one or more non-transitory machine-readable storage media of claim 13, wherein to determine the first throttle value comprises to determine a threshold number of unanswered memory read requests.

16. The one or more non-transitory machine-readable storage media of claim 13, wherein to determine the first throttle value comprises to determine a threshold delay between memory write requests.

17. The one or more non-transitory machine-readable storage media of claim 13, wherein to determine the first throttle value comprises to determine a threshold number of unanswered requests to another one of the throttled devices.

18. The one or more non-transitory machine-readable storage media of claim 13, wherein to determine the first throttle value comprises to determine a threshold delay between sequential requests to another one of the throttled devices.

19. The one or more non-transitory machine-readable storage media of claim 13, wherein the plurality of instructions further cause the network device to:
  assign a first network packet to the first virtual machine and a second network packet to the second virtual machine;
  wherein to perform the first function subject to the first throttle value comprises to perform the first function by the first virtual machine, based on the first network packet, subject to the first throttle value; and
  wherein to perform the second function subject to the second throttle value comprises to perform the second function by the second virtual machine, based on the second network packet, subject to the second throttle value.

20. The one or more non-transitory machine-readable storage media of claim 19, wherein the plurality of instructions further cause the network device to:
  analyze the first network packet; and
  adjust the first throttle value based on the analysis of the first network packet.

21. The one or more non-transitory machine-readable storage media of claim 20, wherein:
  to analyze the first network packet comprises to determine whether the first network packet is associated with a malicious attack; and
  to adjust the first throttle value comprises to reduce the first throttle value in response to a determination that the first network packet is associated with a malicious attack.

22. The one or more non-transitory machine-readable storage media of claim 20, wherein:
  to analyze the first network packet comprises to determine a priority level associated with a source of the first network packet; and
  to adjust the first throttle value comprises to selectively increase or decrease the first throttle value based on the determined priority level.

23. The one or more non-transitory machine-readable storage media of claim 13, wherein the plurality of instructions further cause the network device to:
  track a quality-of-service associated with the network device;
  determine whether the first virtual machine has historically reduced the quality of service; and
  reduce, in response to a determination that the first virtual machine has historically reduced the quality of service, the first throttle value.

24. The one or more non-transitory machine-readable storage media of claim 13, wherein:
  to perform the first function subject to the first throttle value comprises to set at least one register in each of the one or more throttled devices utilized by the first virtual machine to perform the first function subject to the first throttle value; and
  to perform the second function subject to the second throttle value comprises to set at least one register in each of the one or more throttled devices utilized by the second virtual machine to perform the second function subject to the second throttle value.

25. A network device to dynamically manage data bus bandwidth usage of virtual machines, the network device comprising:

means for assigning a first function to a first virtual machine and a second function to a second virtual machine of the network device, wherein each of the first virtual machine and the second virtual machine utilizes one or more throttled devices to perform the assigned first function or second function, wherein each throttled device is configured to use no more than an amount of data bus bandwidth of a data bus internal to the network device, wherein the data bus bandwidth is associated with at least one throttle value assigned to the corresponding throttled device;

means for determining for each of the one or more throttled devices utilized by the first virtual machine to perform the first function, a first throttle value based on the first function;

means for determining for each of the one or more throttled devices utilized by the second virtual machine to perform the second function, a second throttle value based on the second function;

means for performing, with the first virtual machine, the first function subject to the first throttle value; and means for performing, with the second virtual machine, the second function subject to the second throttle value.

* * * * *